US011336601B2

(12) United States Patent
Jiménez et al.

(10) Patent No.: US 11,336,601 B2
(45) Date of Patent: May 17, 2022

(54) PUBLISH-SUBSCRIBE MESSAGING SYSTEMS, METHODS, APPARATUSES, COMPUTER PROGRAMS AND COMPUTER PROGRAM PRODUCTS

(71) Applicant: Telefonaktiebolaget LM Ericsson (publ), Stockholm (SE)

(72) Inventors: Jaime Jiménez, Helsinki (FI); Ramamurthy Badrinath, Bangalore (IN); Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 286 days.

(21) Appl. No.: 16/489,183

(22) PCT Filed: Feb. 28, 2017

(86) PCT No.: PCT/EP2017/054650
§ 371 (c)(1),
(2) Date: Aug. 27, 2019

(87) PCT Pub. No.: WO2018/157916
PCT Pub. Date: Sep. 7, 2018

(65) Prior Publication Data
US 2020/0067865 A1    Feb. 27, 2020

(51) Int. Cl.
*G06F 15/16* (2006.01)
*H04L 51/00* (2022.01)
*H04L 67/125* (2022.01)
*H04L 67/55* (2022.01)

(52) U.S. Cl.
CPC ............ *H04L 51/16* (2013.01); *H04L 67/125* (2013.01); *H04L 67/26* (2013.01)

(58) Field of Classification Search
CPC .............................. H04L 67/125; H04L 67/26
USPC ..................................................... 709/204, 206
See application file for complete search history.

(56) References Cited

U.S. PATENT DOCUMENTS

| 2010/0241583 A1 | 9/2010 | Garza et al. |
| 2018/0191663 A1* | 7/2018 | Harpaz ................... H04L 51/32 |

FOREIGN PATENT DOCUMENTS

WO    2015/073023 A1    5/2015

OTHER PUBLICATIONS

International Search Report and Written Opinion issued in International Application No. PCT/EP2017/054650, dated Oct. 9, 2017, (13 pages).
Z. Shelby et al., Request for Comment (RFC) 7252, "The Constrained Application Protocol (CoAP)", Internet Engineering Task Force (IETF), Jun. 2014 (112 pages).
(Continued)

*Primary Examiner* — Wing F Chan
*Assistant Examiner* — Andrew Woo
(74) *Attorney, Agent, or Firm* — Rothwell, Figg, Ernst & Manbeck, P.C.

(57) ABSTRACT

Complete and partial object publication using, for example, MQTT or other protocol is described. In some embodiments, an emphasis is placed on keeping the amount of state information that the broker must maintain to a minimum, as well as allowing idempotent operations over objects in order to keep the object view between the subscribers consistent. Embodiments are described in which only the parts of an object have changed are transferred to the subscribers who subscribe to that object.

20 Claims, 9 Drawing Sheets

(56) References Cited

OTHER PUBLICATIONS

Open Mobile Alliance, Lightweight Machine to Machine Technical Specification, Candidate Version 1.0, Apr. 7, 2016 (127 pages).
P. Van Der Stok et al., "Patch and Fetch Methods for Constrained Application Protocol (CoAP)", draft-ietf-core-etch-00, May 8, 2016 (16 pages).
Lightweight MQTT Machine Network—GitHub, Jun. 12, 2019 (2 pages).

* cited by examiner

| Tag value | |
|---|---|
| 0 | s1=66, s2=34, s3=1001, metadata=metadat1 |

FIG. 5A

| Tag value | |
|---|---|
| 0 | s1=99, s2=34, s3=1001, metadata=metadat1 |
| 1 | s1=99 |

FIG. 5B

| Tag value | |
|---|---|
| 0 | s1=99, s2=76, s3=75, metadata=metadat1 |
| 1 | s1=99 |
| 2 | s2=76, s3=88 |

FIG. 5C

| Tag value | |
|---|---|
| 0 | s1=103, s2=76, s3=75, metadata=metadat1 |
| 2 | s2=76 |
| 3 | s1=103, s3=75 |

FIG. 5D

PUBLISH-SUBSCRIBE MESSAGING SYSTEMS, METHODS, APPARATUSES, COMPUTER PROGRAMS AND COMPUTER PROGRAM PRODUCTS

CROSS REFERENCE TO RELATED APPLICATION(S)

This application is a 35 U.S.C. § 371 National Stage of International Patent Application No. PCT/EP2017/054650, filed Feb. 28, 2017, designating the United States.

TECHNICAL FIELD

Disclosed are embodiments related to publish-subscribe messaging systems, methods, apparatus, computer programs, and computer program products.

BACKGROUND

Related Protocols

The Message Queuing Telemetry Transport (MQTT) is an ISO standard publish-subscribe based messaging protocol. It runs on top of Transmission Control Protocol/Internet Protocol (TCP/IP) and is generally dependent on a server (a.k.a., broker) to handle the identifiers (or topics) that clients (i.e., publishers and subscribers) use to share information. MQTT uses a reliable transport that will retransmit until delivery is acknowledged.

The Constrained Application Protocol (CoAP) is an application protocol that fulfills the REST architectural constraints. It is originally designed for low-power IP-based devices.

OMA Lightweight M2M (LWM2M) is a protocol from the Open Mobile Alliance that targets the management of constrained devices. It makes used of the CoAP protocol and creates a set of common interfaces for management on top of it. It also creates a reusable Object Model that defines the data sent between devices and manager.

Operations

CoAP/LWM2M operations can be divided into two groups: 1) safe and idempotent operations and 2) all other operations. Safe methods do not alter a data object (a.k.a., resource or resource representation), idempotent methods can be called as many times as needed without changes to the underlying data object (e.g., you do a PUT operation that always returns the same data object). All operations that only read objects are usually safe and idempotent, operations that update objects are usually idempotent but not safe and then you have POST and PATCH (CoAP PATCH) methods that are neither. This implies that at some point clients might get different versions of the same data object.

In the past, MQTT devices were not as constrained as CoAP devices. Thus, traditionally, when using MQTT there was little concern regarding payload sizes, bandwidth, and/ or uptime. Presently, MQTT is moving toward the CoAP space, thus MQTT systems are going to face similar issues that will have to be handled differently since MQTT is not RESTfull but uses the publish-subscribe paradigm.

SUMMARY

MQTT is not efficient when it comes to publishing large data objects. In MQTT, when a device publishes a data object (or "object" for short), the device transmits the object to the broker whenever the object changes, even if only a very small part (a.k.a., "information element") of the object has changed. It does not matter that the object is 1 KB or 1 MB, it is just a transfer protocol agnostic of the object model. There is current ongoing work on giving a structure to MQTT objects, for example by using the LWM2M IP based smart-objects (ISPSO) over MQTT (LWMQN). Once the protocol includes an object structure instead of a binary blob, it would make sense to also think about how those objects can be shared in a more optimal fashion.

Embodiments for complete and partial object publication using, for example, MQTT or other protocol are described. In some embodiments, an emphasis is placed on keeping the amount of state information that the broker must maintain to a minimum, as well as allowing idempotent operations over objects in order to keep the object view between the subscribers consistent. There is a trade-off between the amount of state to be kept on the broker and the way to identify the updates to make sure they are idempotent. We propose embodiments in which only the parts of an object that have changed are transferred to the subscribers who subscribe to that object. Note that in the current MQTT architecture, the broker does not keep the state of the objects of the subscribers or parts of it.

Accordingly, in one aspect there is provided a method for use in a publish-subscribe messaging system comprising a broker, a publisher, and a subscriber. The method includes the broker receiving from the subscriber a first subscribe message comprising a topic identifier. The method further includes, the broker receiving from a publisher a first publication message comprising a complete object (i.e., an object comprising at least a first part and a second part) and a topic identifier that matches the topic identifier included in the first subscribe message. The complete object comprises a set of information that includes information corresponding to the first part of the complete object and information corresponding to the second part of the complete object that is different than the first part of the complete object. The method also includes the broker sending to the subscriber a second publication message comprising the complete object. The method also includes, the broker, after receiving the first publication message, receiving from the publisher a third publication message comprising the same topic identifier that was included in the first publication message and a partial object comprising information corresponding to the first part of the complete object, but the partial object not including any information corresponding to the second part of the complete object. After receiving the third publication message, the broker receives from the subscriber a second subscribe message comprising the same topic identifier that was included in the first subscribe message. As a result of receiving the second subscribe message, the broker determines whether to send to the subscriber the partial object, wherein determining whether to send to the subscriber the partial object comprises the broker determining whether the subscriber has previously received the partial object. After determining that the subscriber has not previously received the partial object, the broker sends to the subscriber a fourth publication message comprising the partial object.

An advantage of the above described embodiment is that the amount of data that is transmitted and received is reduced, thereby conserving network resources as well as reducing power consumption.

In some embodiments, the method further comprises the broker selecting a first tag value; and the second publication message comprises the first tag value. In such an embodiment, the second subscribe message comprises the first tag value, and the broker determines whether the subscriber has previously received the partial object using the first tag value included in the second subscribe message. In some embodiments, the broker assigns a second tag value to the partial object, and the broker determines that the subscriber has not previously received the partial object as a result of determining that the first tag value included in the second subscribe message is less than the second tag value assigned to the partial object.

In some embodiments, the method further comprises the broker storing state information associated with the subscriber, and the step of determining whether the subscriber has previously received said partial object comprises using the state information to determine whether the subscriber has previously received said partial object. In such an embodiment, the state information associated with the subscriber may comprise a version of the complete object stored in association with a subscriber identifier that identifies the subscriber. In some embodiments, the method further comprises the broker maintaining a master version of the complete object, and the step of using the state information to determine whether the subscriber has previously received said partial object comprises comparing the version of the complete object stored in association with the subscriber identifier with the master version of the complete object. In some embodiments, the state information associated with the subscriber comprises a first tag value associated with a subscriber identifier that identifies the subscriber. The method may further comprises the broker assigning a second tag value to the partial object, and the step of using the state information to determine whether the subscriber has previously received said partial object comprises comparing the first tag value associated with the subscriber identifier with the second tag value assigned to the partial object.

In some embodiments, the fourth publication message further comprises at least part of a second partial object transmitted by the publisher to the broker.

BRIEF DESCRIPTION OF THE DRAWINGS

The accompanying drawings, which are incorporated herein and form part of the specification, illustrate various embodiments.

FIGS. 5A, 5B, 5C, and 5D illustrate information maintained by a broker according to some embodiments.

DETAILED DESCRIPTION

Overview of Publish-Subscribe Based Communications

Figure 1:
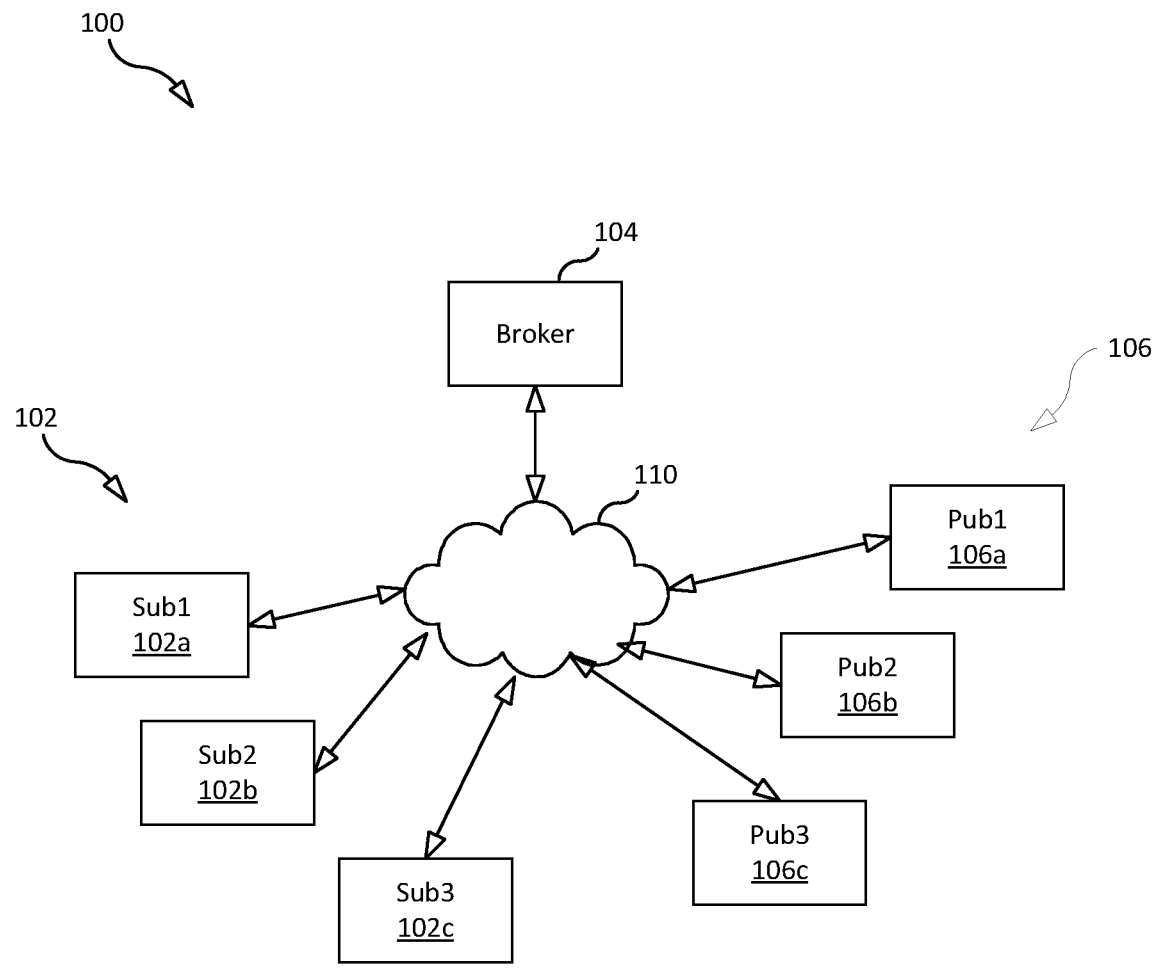
FIG. 1 illustrates an exemplary publish-subscribe communication system.

FIG. 1 illustrates an exemplary publish-subscribe communication system 100, which comprises several clients (i.e., subscribers and publishers) communicating with each other via a server (a.k.a., "broker"). Specifically, FIG. 1 shows a plurality of subscribers 102 (i.e., sub1 102a, sub2 102b, and sub3 102c) and a plurality of publishers 106 (i.e., pub1 106a, pub2 106b, pub3 106c) communicating through a broker 104 and a network 110 (e.g., the Internet). Each subscriber 102 that desires to subscribe to a particular topic transmits to broker 104 a subscription message comprising an identifier identifying the topic to which the subscriber would like to subscribe (i.e., identifying the topics for which the subscriber 102 would like to receive corresponding published data objects). A publisher 106 who desires to publish a data object (or "object" for short) corresponding to a particular topic transmits to the broker 104 a publication message comprising the object and a topic identifier identifying the topic to which the object corresponds. In response to receiving such a publication message, broker 104 transmits to each subscriber 102 that has subscribed to the identified topic a publication message comprising the object and the topic identifier. Thus, publication messages moving between broker 104 and the clients (subscribers and publishers) all carry a topic identifier and an object.

In MQTT topics are identified by UTF-8 strings, which are used by the broker to filter messages for each connected subscriber. Each subscriber establishes a persistent TCP connection with the broker and the broker transmits publication messages to the subscriber using the TCP connection. If the TCP connection is lost, the subscriber must establish a new TCP connection in order for the broker to resume sending to the subscriber publication messages that match the topics to which the subscriber has subscribed.

MQTT contemplates a set of wildcards: single level and multi-level wildcards. Topics are organized hierarchically, separated by "/", to represent any level wildcard the "+" symbol can be used. To subscribe to all underlying topic levels the "#" symbol can be used.

Figure 2:
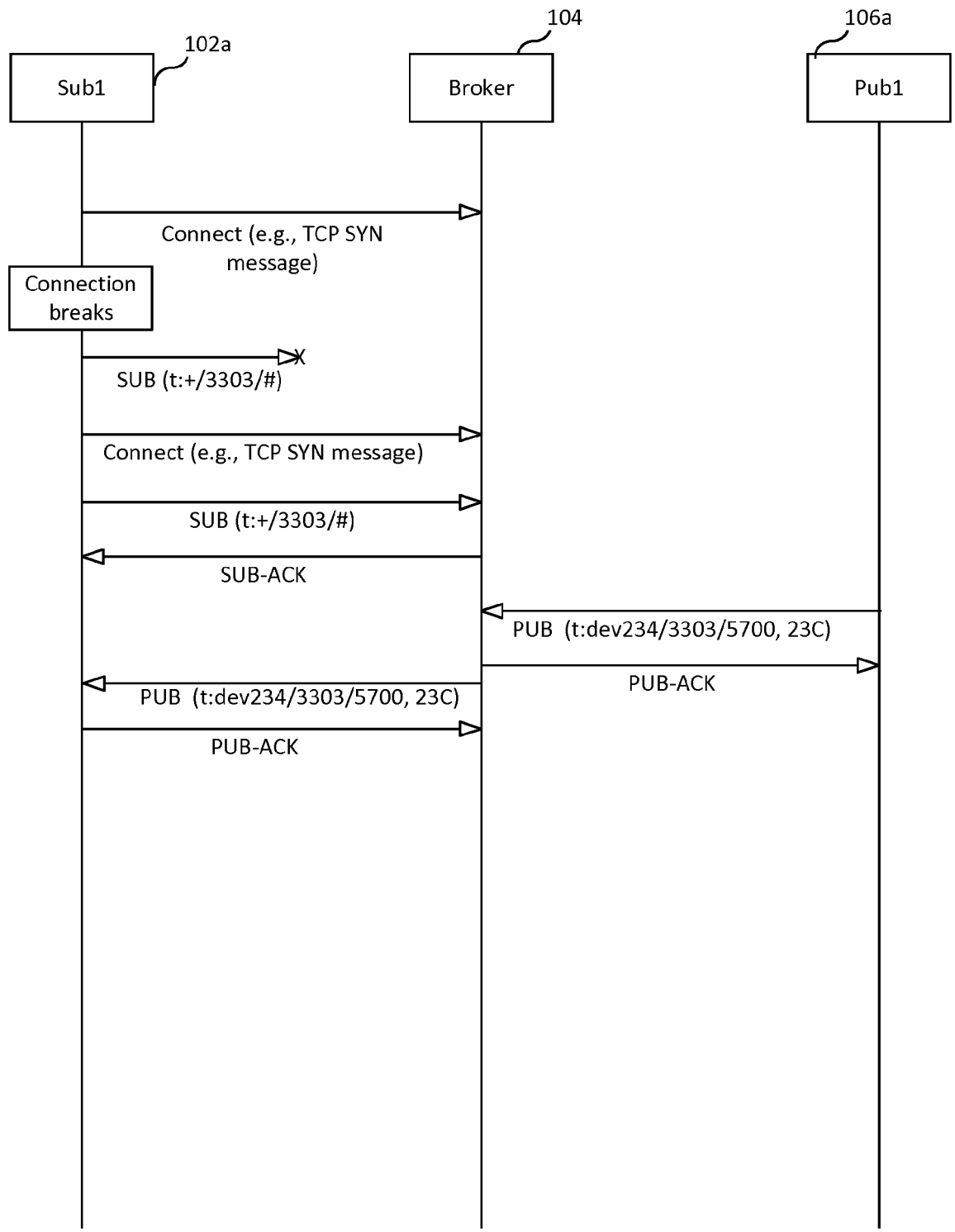
FIG. 2 is a message flow diagram illustrating a publish-subscribe process.

FIG. 2 shows an example of MQTT interaction using both MQTT and LWM2M/IPSO objects. First sub1, which in this example is an MQTT subscriber, initiates a connection (e.g., a TCP connection) with the broker 104. As is known in the art, sub1 102a initiates the TCP connection by transmitting a TCP synchronize (SYN) message to broker 104, which then responds with a SYN acknowledgment message (SYN-ACK) and sub1 102a then replies with an ACK. After the connection is established, sub1 102a transmits to broker 104 a subscribe message in an attempt to subscribe to a topic. In this example, the connection was broken prior to sub1 102a transmitting the subscribe message and sub1 102a detects that the connection has been broken. Sub1 102a must establish a new TCP connection with the broker in order to communicate subscription messages to the broker and receive corresponding publication messages from the broker. This is important because for constrained environments devices will be asleep most of the time, thus this type of connectivity that relies on a session could be problematic. After establishing the new TCP connection with the broker 104, sub1 102a successfully subscribes to the "+/3303/#" topic, which translates into subscribing to "all devices of the IPSO temperature type and all their objects and resources." From this moment on, any time a device (i.e., a publisher) sends to the broker 104 a publication message containing a topic identifier that matches topic "+/3303/#", the subscriber 102 will get from the broker 104 a publication message comprising the object that was included in the publication message sent by the publisher. This is what happens when pub1 106a publishes its current temperature reading "23 C" to the "dev234/3303/0/5700" topic.

Assuming that a publisher 106 has a simple, yet structured object model like IPSO Objects, then the publisher will publish object corresponding to topics of the form "DeviceID/ObjectID/InstanceID/ResourceID" or a combination of those using wildcards. This topic setup might seem useful at first but it quickly reaches into a problematic situation when many publishers are used and when more complex objects are sent around. Moreover for high throughput cases (depending on what we understand by "high") subscribing to the "#" wildcard is not a good idea.

As an example, consider a subscriber 102 (e.g., an actuator device) with a complex logic that has subscribed to thousands of different devices, which, in a large majority, are mostly sharing metadata. We could envisage a complex topic structure at the broker or a very granular and tailor-made configuration for each device. However, it is better to define a concept of the "partial notification," which concept is new to MQTT.

Partial Notifications

An objective with partial notifications is that the clients can keep a minimum state and minimum bandwidth over time, so that they can save battery.

MQTT differs from CoAP in the fact that all traffic between endpoints in a MQTT network goes through a broker, while CoAP can be formed to be more distributed with device-to-device interactions, it can also operate in a similar way as MQTT does.

In one embodiment, for each publisher that publishes an object to the broker, the broker maintains an up-to-date version of the object. Thus, the broker can be the entity guaranteeing that all operations are idempotent.

Figure 3:
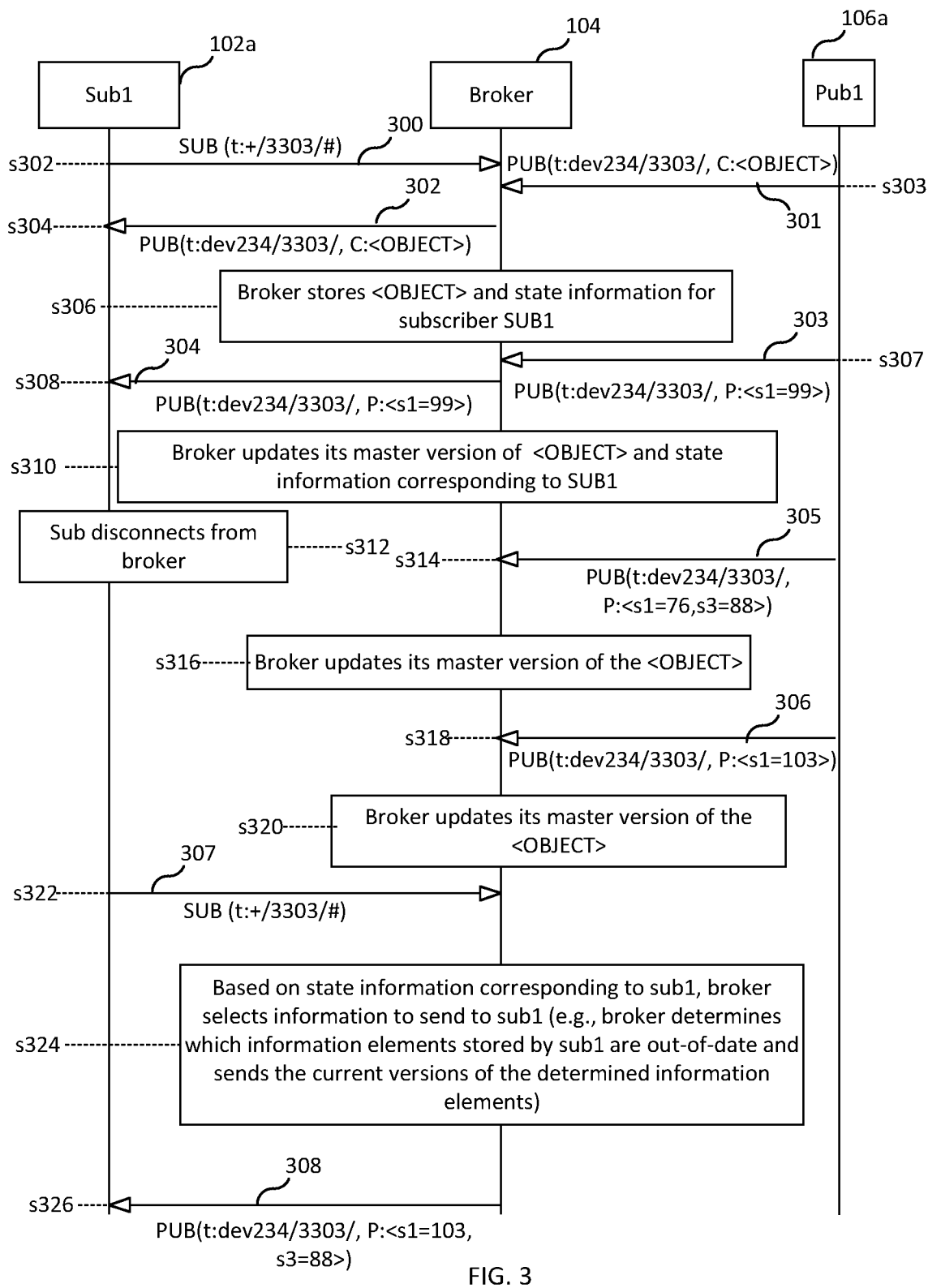
FIG. 3 is a message flow diagram illustrating a publish-subscribe process according to one embodiment.

FIG. 3 shows an example message flow according to one embodiment.

In the example, shown, the message flow begins with step s302 in which sub1 102a transmits to broker 104 a subscribe message 300 that contains a topic identifier (ID) (e.g., "+/3303/#") identifying a topic to which sub1 102a is subscribing.

In step s303 pub1 106a transmits to broker 104 a publication message 301 comprising a topic ID (e.g., "dev234/3303/") and comprising a payload that comprises a complete object (i.e., an object comprising two or more parts) corresponding to the identified topic. In some embodiments, the publication message 301 includes an indicator indicating that the payload of message 301 consists of a complete object, as opposed to a partial object.

The complete object transmitted in step s303 includes a plurality of parts (a.k.a., "information elements"). In some embodiments, a part of a complete object may be a distinct value (e.g., a temperature reading from a particular temperature sensor). In other embodiments, a part may consist of a distinct value and an attribute associated with the value (e.g., an "attribute-value pair" (AVP)). Thus, the complete object transmitted in step s303 may comprise a plurality of sensor readings, wherein each sensor reading included in the complete object is from a different sensor. Additionally, the complete object may include other parts that are static (or that change rarely), such as a meta-data information element. For the sake of simplicity, we shall assume that the complete object transmitted in step s303 consists of four parts and each part is in the form of an attribute-value pair, wherein each of the four attributes is unique. As a specific example, the first attribute-value pair has an attribute that identifies a first sensor (s1) and a value that is the current reading of sensor s1; the second attribute-value pair has an attribute that identifies a second sensor (s2) and a value that is the current reading of sensor s2; the third attribute-value pair has an attribute that identifies a third sensor (s3) and a value that is the current reading of sensor s3; and the fourth attribute-value pair has an attribute that identifies a set of metadata (metadata1) and a value that contain the current set of metadata. FIG. 5A illustrates an example of the complete object (i.e. s1=66;s2=34;s3=1001;metadata=metadata1).

In step s304, because the topic ID included in publish message 301 matches the topic ID included in the subscribe message 300, broker 104 forwards the complete object to sub1 102a. For example, in step s304, broker 104 transmits to sub1 102a a publication message 302 that contains the complete object that was contained in message 301. In some embodiments, the publication message 302 includes an indicator indicating that the payload of message 302 consists of a complete object, as opposed to a partial object.

In step s306, broker 104 stores a master version of the complete object (i.e. s1=66;s2=34;s3=1001; metadata=metadata1) and stores state information for sub1 102a, which state information indicates that sub1 102a has received the complete object corresponding to topic ID that was transmitted by pub1 106a. As one example, the state information may comprise a data record that contains a first field storing a subscriber identifier that identifies sub1 102a and a second field that stores a copy of the complete object (or a pointer to a copy of the complete object), which copy of the complete object is separate from the master version of the complete object and is specifically associated with sub1 102a. The data record may also contain a third field for storing the topic ID contained in message 300 (i.e., "+/3303/#") and a fourth field for storing a publisher identifier that identifies pub1 106a.

In step s307 pub1 106a transmits to broker 104 a publication message 303 comprising a topic ID (i.e., "dev234/3303/") and comprising a payload that comprises a partial object corresponding to the identified topic. That is, the payload of message 303 includes some but not all of the AVPs that make up the complete object. In the example shown, the payload consists of the first AVP of the object (i.e., s1=99). The value 99 represents the current reading of sensor s1. In some embodiments, the publication message 303 includes an indicator indicating that the payload of message 303 consists of a partial object, as opposed to a complete object.

In step s308, broker 104 forwards the partial object to sub1 102a because the topic ID included in publish message 303 matches the topic ID included in subscribe message 300. That is, broker 104 transmits to sub1 102a a publication message 304 containing the partial object contained in message 303.

In step s310, broker 104 updates its master version of the complete object based on the content of publication message 303. More specifically, in this example, because the publication message 303 includes the latest reading from sensor s1, broker 104 update its master version of the complete object by replacing the value that is associated with attribute s1 with the value associated with attribute s1 from message 303. Thus, if just before step s310 the master version of the complete object looked like this: (s1=66;s2=34;s3=1001; metadata=metadata1) then just after step s310 is performed the master version of the complete object would look like this: (s1=99;s2=34;s3=1001;metadata=metadata1) (see FIG. 5B for an example). That is, in step s310, broker 104 update the first AVP of the master version of the complete object based on the data included in publication message 303, as can be seen by comparing FIG. 5B with 5A.

Additionally, in step s310 broker 104 updates internally the state information associated with sub1 102a. More specifically, in step s310 broker 104 updates the copy of the complete object that broker 104 has stored specifically for sub1 102*a* (i.e., the copy of the complete object stored in (or referenced by) the second field of the above mentioned data record) based on the content of publication message 303. That is, in this example, because the publication message 303 includes the latest reading from sensor s1, broker 104 updates internally sub1 102*a*'s copy of the complete object by replacing the value that is associated with attribute s1 with the value associated with attribute s1 from message 303. Thus, if just before step s310 the sub1 102*a*'s copy of the complete object looked like this: (s1=66;s2=34;s3=1001;metadata1=some metadata) then just after step s310 is performed sub1 102*a*'s copy of the complete object would look like this: (s1=99;s2=34;s3=1001;metadata1=some metadata). That is, in step s310, broker 104 updates internally the first AVP of sub1 102*a*'s copy of the complete object based on the data included in publication message 303.

In step s312, sub1 102*a* disconnects from broker 104.

In step s314, pub1 106*a* transmits to broker 104 a publication message 305 comprising a topic ID (i.e., "dev234/3303/") and comprising a payload that comprises a partial object corresponding to the identified topic. That is, the payload of message 305 includes some but not all of the AVPs that make up the complete object. In the example shown, the payload consists of the first and third AVPs of the object (i.e., s1=76 and s3=88). In some embodiments, the publication message 305 includes an indicator indicating that the payload of message 305 consists of a partial object, as opposed to a complete object.

In step s316, broker 104 updates its master version of the complete object based on the content of publication message 305. More specifically, in this example, because the publication message 305 includes the latest reading from sensors s1 and s3, broker 104 update its master version of the complete object by replacing the value that is associated with attributes s1 and s3 with the values associated with attributes s1 and s3 from message 305. Thus, if just before step s316 the master version of the complete object looked like this: (s1=99;s2=34;s3=1001;metadata=metadata1) then just after step s316 is performed the master version of the complete object would look like this: (s1=76;s2=34;s3=88; metadata=metadata1). That is, in step s316, broker 104 update the first and third AVPs of its master version of the complete object based on the data included in publication message 305.

In step 318, pub1 106*a* transmits to broker 104 a publication message 306 comprising a topic ID (i.e., "dev234/3303/") and comprising a payload that comprises a partial object corresponding to the identified topic. That is, the payload of message 306 includes some but not all of the AVPs that make up the complete object. In the example shown, the payload consists of the first AVP of the object (i.e., s1=103). The value 103 represents the current reading of sensor s1. In some embodiments, the publication message 306 includes an indicator indicating that the payload of message 306 consists of a partial object, as opposed to a complete object.

In step s320, broker 104 updates its master version of the complete object based on the content of publication message 306. More specifically, in this example, because the publication message 306 includes the latest reading from sensor s1, broker 104 update its master version of the complete object by replacing the value that is associated with attribute s1 with the value associated with attribute s1 from message 306. Thus, if just before step s320 the master version of the complete object looked like this: (s1=76;s2=34;s3=88; metadata=metadata1) then just after step s320 is performed the master version of the complete object would look like this: (s1=103;s2=34;s3=88;metadata=metadata1). That is, in step s320, broker 104 update the first AVP of the master version of the complete object based on the data included in publication message 306.

In step s322, sub1 102*a* establishes a new connection with broker 104 and transmits to broker 104 subscribe message 307, which includes the topic ID "+/3303/#".

In step s324, broker 104, based on the state information that broker 104 maintains for sub1 102*a*, selects information to send to sub1 102*a*. The state information used in step s324 is the state information maintained by broker 104 that is associated with both sub1 102*a* and topic ID "+/3303/#". In this example, the state information associated with both sub1 102*a* and topic ID "+/3303/#" is sub1 102*a*'s copy of the complete object that is maintained by broker 104. Sub1 102*a*'s copy of the complete object that is maintained by broker 104 was last updated in step 310. In step s324, broker 104 compares sub1 102*a*'s copy of the complete object with the master version of the complete object, which was last updated in step s320, to determine the parts of sub1 102*a*'s copy of the complete object that are not up-to-date. In this example, sub1 102*a*'s copy of the complete object does not have the up-to-date sensor readings for sensors s1 and s3. Thus, in step s324, broker 104 selects these sensors readings to send to sub 1.

As shown in FIG. 3, in step s326 broker 104 transmits to sub1 102*a* a publication message 308 that contains a partial object—i.e., the payload of publication message 308 includes only the information selected in step s324. Thus, the publication message 308 includes only two of the four parts that make-up the complete object.

Figure 4:
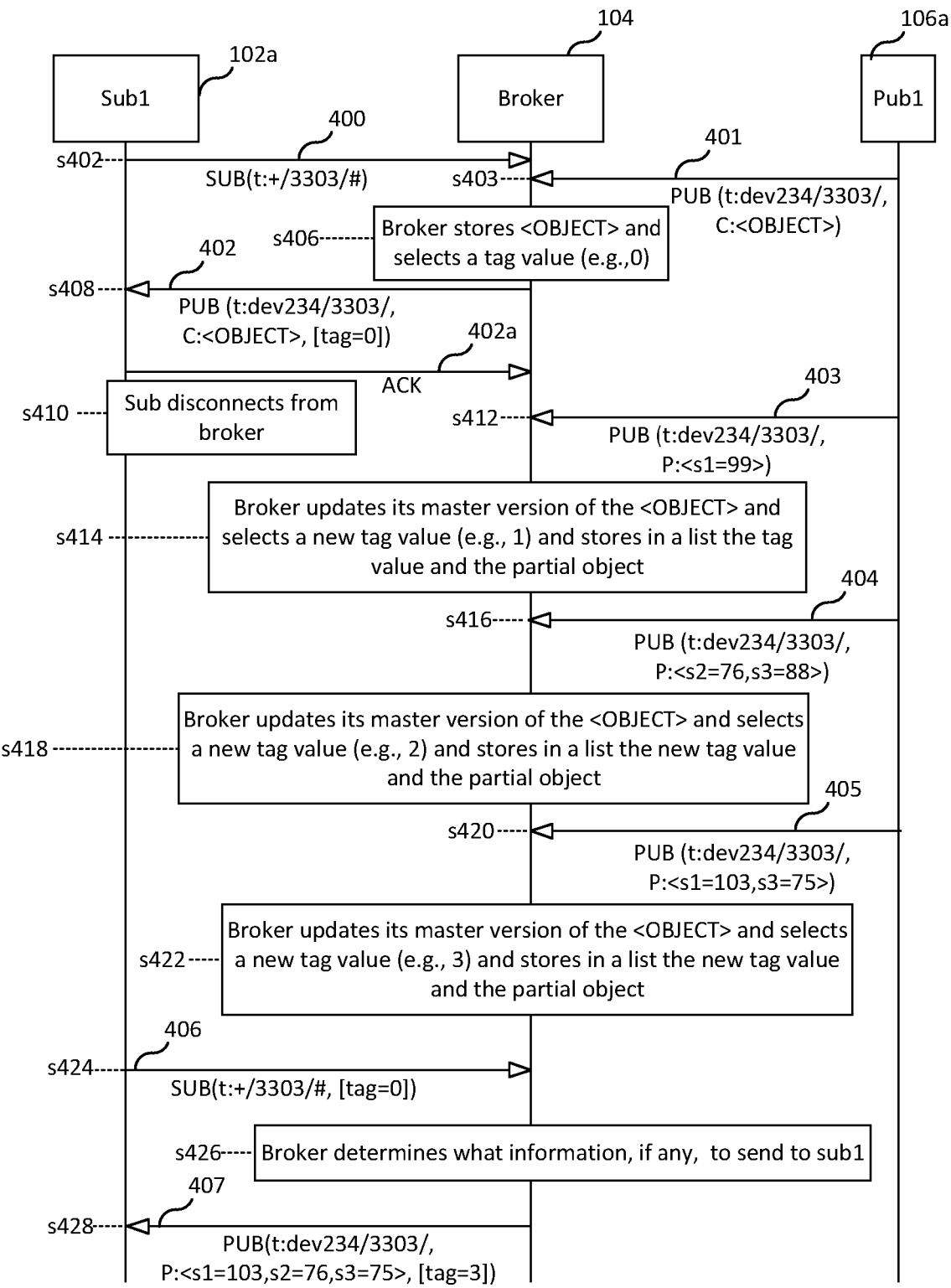
FIG. 4 is a message flow diagram illustrating a publish-subscribe process according to one embodiment.

FIG. 4 shows an example message flow according to another embodiment.

In the example, shown, the message flow begins with step s402 in which sub1 102*a* transmits to broker 104 a subscribe message 400 that contains a topic identifier (ID) (i.e., "+/3303/#") identifying a topic to which sub1 102*a* is subscribing.

In step s403 pub1 106*a* transmits to broker 104 a publication message 401 comprising a topic ID (i.e., "dev234/3303/") and comprising a payload that comprises a complete object corresponding to the identified topic. In some embodiments, the publication message 401 includes an indicator indicating that the payload of message 401 consists of a complete object, as opposed to a partial object. In this example, the complete object transmitted in step s403 is the same complete object transmitted in step s303 described above (s1=66;s2=34;s3=1001;metadata=metadata1).

In step s406, broker 104 stores a master version of the complete object included in publication message 401. Additionally, in step s406, broker 104 selects a tag value (e.g., the value 0 or a timestamp, where the timestamp is a value representing an amount of time (e.g., number of seconds) that has elapsed since a certain point of time in the past). Broker 104 may store the selected tag value in association with a publisher identifier that identifies pub1 106*a* and topic ID "dev234/3303/". For example, broker 104 may store a record with a first field that includes the publisher identifier that identifies pub1 106*a*, a second field that stores topic ID "dev234/3303/", and a third field that stores the selected tag value.

In step s408, broker 104 forwards the complete object to sub1 102*a* because the topic ID included in publish message 401 matches the topic ID included in subscribe message 400. For example, in step s408, broker 104 transmits to sub1 102*a* a publication message 402 that contains the complete object that was contained in message 401 (s1=66;s2=34; s3=1001; metadata=metadata1). In some embodiments, the publication message 402 includes an indicator indicating that the payload of message 302 consists of a complete object, as opposed to a partial object. Additionally, in some embodiments, publication message 402 also contains the tag value that was selected in step s406. Further, in some embodiments, broker 104 stores the state information for sub1 102*a*, which the state information indicates that sub1 102*a* has received the complete object. That is, for example, when broker 104 receives an acknowledgment message 402*a* from sub1 102*a*, that sub1 102*a* received message 402, broken 104 stores the state information. As one example, the state information may comprise a data record that contains a first field storing a subscriber identifier that identifies sub1 102*a* and a second field that stores the selected tag value. The data record may also contain a third field for storing the topic ID contained in message 400 (i.e., "+/3303/#") and a fourth field for storing a publisher identifier that identifies pub1 106*a*.

In step s410, sub1 102*a* disconnects from broker 104.

In step s412, pub1 106*a* transmits to broker 104 a publication message 403 comprising a topic ID (i.e., "dev234/3303/") and comprising a payload that comprises a partial object corresponding to the identified topic. That is, the payload of message 403 includes some but not all of the parts that make up the complete object. In the example shown, the payload consists of the first part (i.e., s1=99). In some embodiments, the publication message 403 includes an indicator indicating that the payload of message 403 consists of a partial object, as opposed to a complete object.

In step s414, broker 104 updates its master version of the complete object based on the content of publication message 403. More specifically, in this example, because the publication message 403 includes the latest reading from sensor s1, broker 104 update its master version of the complete object by replacing the value that is associated with attribute s1 with the value associated with attribute s1 from message 403. Thus, if just before step s414 the master version of the complete object looked like this: (s1=66;s2=34;s3=1001; metadata=metadata1) then just after step s414 is performed the master version of the complete object would look like this: (s1=99;s2=34;s3=1001;metadata=metadata1). That is, in step s414, broker 104 updates the first part of the master version of the complete object based on the data included in publication message 403. Additionally, in step s414, broker 104 selects a new tag value. Selecting the new tag value may include incrementing the tag value selected in step s406 or obtaining a current timestamp. Broker 104 then stores the new tag value in association with the partial object included in publication message 403. This is illustrated in FIG. 5B. In the example shown in FIG. 5B, broker 104 selected the new tag value by incrementing by 1 the tag value selected in step s406.

In step s416, pub1 106*a* transmits to broker 104 a publication message 404 comprising a topic ID (i.e., "dev234/3303/") and comprising a payload that comprises a partial object corresponding to the identified topic. That is, the payload of message 404 includes some but not all of the parts that make up the complete object. In the example shown, the payload consists of the second and third parts (i.e., s2=76,s3=88). In some embodiments, the publication message 404 includes an indicator indicating that the payload of message 404 consists of a partial object, as opposed to a complete object.

In step s418, broker 104 updates its master version of the complete object based on the content of publication message 404. More specifically, in this example, because the publication message 404 includes the latest reading from sensors s2 and s3, broker 104 updates its master version of the complete object by replacing the values that are associated with attributes s2 and s3 with the values associated with attributes s2 and s3 from message 404, respectively. Thus, if just before step s418 the master version of the complete object looked like this: (s1=99;s2=34;s3=1001; metadata=metadata1) then just after step s418 is performed the master version of the complete object would look like this: (s1=99;s2=76;s3=88;metadata=metadata1). That is, in step s418, broker 104 updates the second and third parts the master version of the complete object based on the data included in publication message 404. Additionally, in step s418, broker 104 selects a new tag value. Selecting the new tag value may include incrementing the tag value selected in step s414 or obtaining a current timestamp. Broker 104 then stores the new tag value in association with the partial object included in publication message 404. This is illustrated in FIG. 5C. In the example shown in FIG. 5C, broker 104 selected the new tag value by incrementing by 1 the tag value selected in step s414. As further shown in FIG. 5C, broker 104 is keeping a list of tag value/partial object pairs.

In step s420, pub1 106*a* transmits to broker 104 a publication message 405 comprising a topic ID (i.e., "dev234/3303/") and comprising a payload that comprises a partial object corresponding to the identified topic. That is, the payload of message 405 includes some but not all of the parts that make up the complete object. In the example shown, the payload consists of the first and third parts (i.e., s1=103,s3=75). In some embodiments, the publication message 405 includes an indicator indicating that the payload of message 405 consists of a partial object, as opposed to a complete object.

In step s422, broker 104 updates its master version of the complete object based on the content of publication message 405 in the same manner as described above with respect to step s418. Thus, if just before step s422 the master version of the complete object looked like this: (s1=99;s2=76; s3=88;metadata=metadata1) then just after step s422 is performed the master version of the complete object would look like this: (s1=103;s2=76;s3=75;metadata=metadata1). Additionally, in step s422, broker 104 selects a new tag value. Selecting the new tag value may include incrementing the tag value selected in step s418 or obtaining a current timestamp. Broker 104 then stores the new tag value in association with the partial object included in publication message 405. This is illustrated in FIG. 5D. In the example shown in FIG. 5D, broker 104 selected the new tag value by incrementing by 1 the tag value selected in step s418. As further shown in FIG. 5D, broker 104 removed the stale information from the list. Specifically, broker 104 removed the first entry from the list because the first entry included only a value for the first part and the publication message 405 included a new value for that part, and broker 104 modified the second entry in the list to remove from the second entry the AVP s3=88 because the publication message 405 included a new value for that part (i.e., s3=75).

In step s424, sub1 102*a* establishes a new connection with broker 104 and transmits to broker 104 subscribe message 406, which includes the topic ID "+/3303/#". In embodiments in which broker 104 includes a tag value in the publication messages that it sends to sub1 102*a*, sub1 102*a* will include in each subscribe message that it sends to broker 104 and that contains a topic ID that matches the topic ID included in a publication message containing a tag value the most recent tag value that sub1 102a received from broker 104 with respect to that topic ID. Thus, as shown in FIG. 4, subscribe message 406 may include the tag value of 0 since in some embodiments this is the most recent tag value that sub1 102a received from broker 104 with respect to topic ID "+/3303/#".

In step s426, in response to the subscribe message 406, broker 104 determines what information, if any, to send to sub1 102a. More specifically, broker 104 uses a tag value associated with sub1 102a (e.g., a tag value, if any, included in message 406 or a tag value stored in association with a subscriber identifier that identifies sub1 102a) and the list shown in FIG. 5D to determine the object information that sub1 102a does not have. In this example, the tag value associated with sub1 102a is a value of 0, which means that sub1 102a does not have any of the object information in the list because the tag value of 0 is less than the lowest tag value in the list (i.e., the tag value of 2). If for example, the tag value associated with sub1 102a was a value of 2, then broker 104 would have determined that sub1 102a is only missing the object information included in the last entry of the list (i.e., the entry associated with the tag value of 3). As another example, if the tag value associated with sub1 102a was a value of 3, then broker 104 would have determined that sub1 102a is not missing any object information.

In step s428, broker 104 sends to sub1 102a a publication message 407 having a payload that contains only the object information that was determined in step s426, which in this example, is all of the object information from the list shown in FIG. 5D.

As the above examples demonstrate, broker 104 can be used to facilitate the sending of partial notifications. As described previously, this has the advantage of reducing the amount of network resources that are used because it reduces the amount of data that a publisher 106 has to send and reduced the amount of data that a subscriber 102 receives, which in-turn allows the publisher 106 and subscriber 102 to use less energy, which can be very important if the publisher 106's or subscriber 102's source of power is limited.

Figure 6:
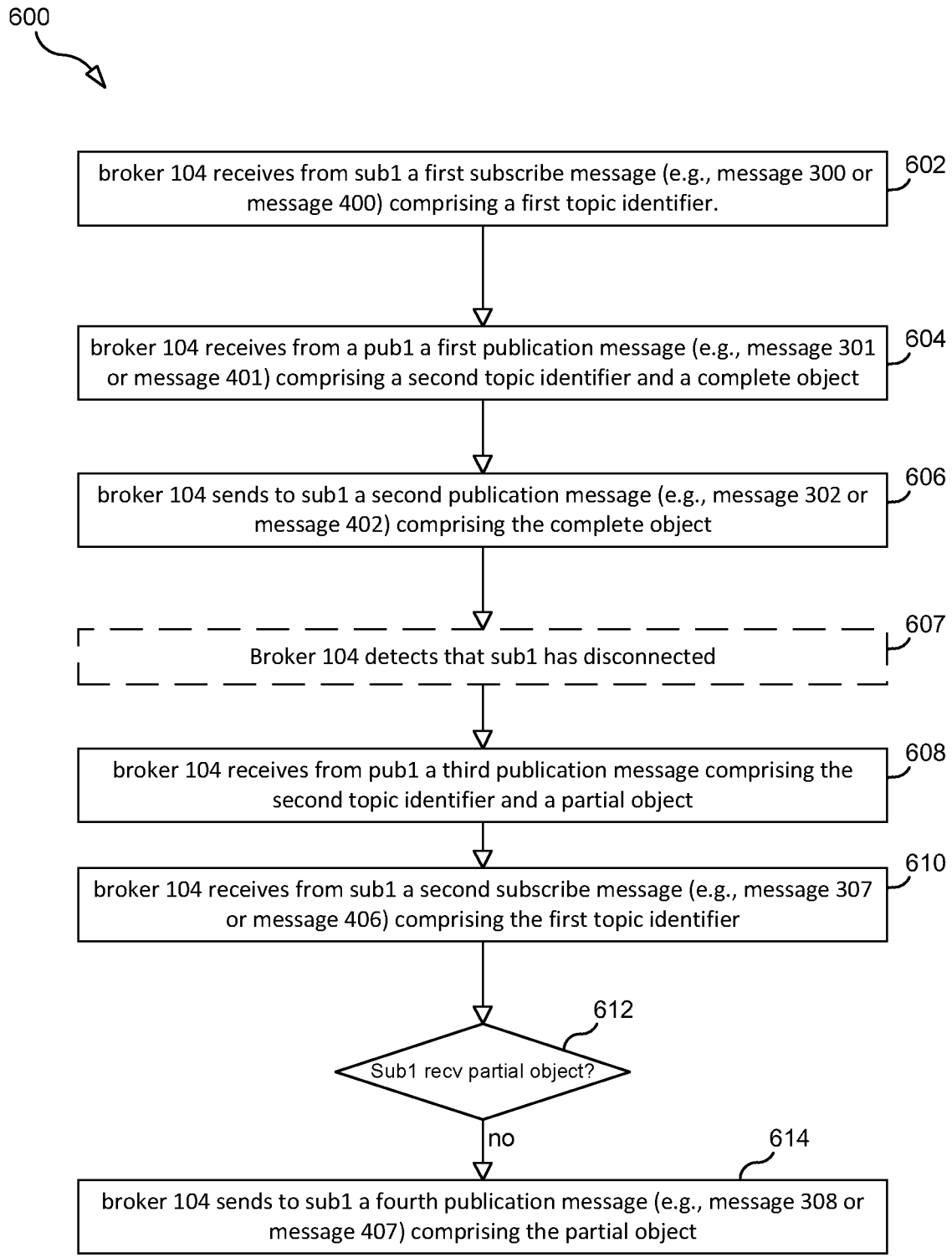
FIG. 6 is a flow chart illustrating a process according to some embodiments.

FIG. 6 is a flow chart illustrating a process 600 according to some embodiments. Process 600 may begin in step 602 in which broker 104 receives from sub1 102a a first subscribe message (e.g., message 300 or message 400) comprising a topic identifier (e.g., +/3303/#).

In step 604, broker 104 receives from pub1 106a a first publication message (e.g., message 301 or message 401) comprising a topic identifier (e.g., dev234/3303) and a complete object. The complete object consists of a set of information comprising: information corresponding to a first part of the complete object and information corresponding to a second part of the complete object that is different than the first part of the complete object.

In step 606, broker 104 sends to sub1 102a a second publication message (e.g., message 302 or message 402) comprising the complete object because the topic ID included in the first publication message (i.e., dev234/3303/) matches the topic ID included in the subscriber message (i.e., +/3303/#).

In step 608, broker 104 receives from pub1 106a a third publication message (e.g., message 306 or message 405) comprising the same topic identifier (i.e., dev234/3303/) and a partial object. The partial object comprises information corresponding to the first part of the complete object, but the partial object does not include any information corresponding to the second part of the complete object. Hence, the partial object is just some portion of the complete object.

In step 610, after receiving the third publication message, broker 104 receives from sub1 102a a second subscribe message (e.g., message 307 or message 406) comprising the same topic identifier as before (i.e., +/3303/#).

In step 612, as a result of receiving the second subscribe message, broker 104 determines whether to send to sub1 102a the partial object, wherein determining whether to send to sub1 102a the partial object comprises broker 104 determining whether sub1 102a has previously received the partial object.

In step 614, after determining that sub1 102a has not previously received the partial object, broker 104 sends to sub1 102a a fourth publication message (e.g., message 308 or message 407) comprising the partial object.

In some embodiments, the method may also include a step 607 in which broker 104 detects that sub1 102a has disconnected.

In some embodiments, process 600 further comprises broker 104 selecting a first tag value, the second publication message comprises the first tag value, the second subscribe message comprises the first tag value, and broker 104 determines whether sub1 102a has previously received the partial object using the tag value included in the second subscribe message. In some embodiments, broker 104 assigns a second tag value to the partial object, and broker 104 determines that sub1 102a has not previously received the partial object as a result of determining that the tag value included in the second subscribe message is less than the tag value assigned to the partial object.

In some embodiments, process 600 further comprises broker 104 storing state information associated with sub1 102a, and the step of determining whether sub1 102a has previously received the partial object comprises using the state information to determine whether sub1 102a has previously received the partial object.

In some embodiments, the state information associated with sub1 102a comprises a version of the complete object stored in association with a subscriber identifier that identifies sub1 102a, process 600 further comprises broker 104 maintaining a master version of the complete object, and the step of using the state information to determine whether sub1 102a has previously received the partial object comprises comparing the version of the complete object stored in association with sub1 102a identifier with the master version of the complete object.

In other embodiments, the state information associated with sub1 102a comprises a tag value associated with the subscriber identifier, process 600 further comprises broker 104 assigning a tag value to the partial object, and the step of using the state information to determine whether sub1 102a has previously received the partial object comprises comparing the tag value associated with sub1 102a identifier with the tag value assigned to the partial object.

In some embodiments, the fourth publication message (e.g., message 308 or message 407) further comprises at least part of a second partial object transmitted by pub1 106a to broker 104.

Figure 7:
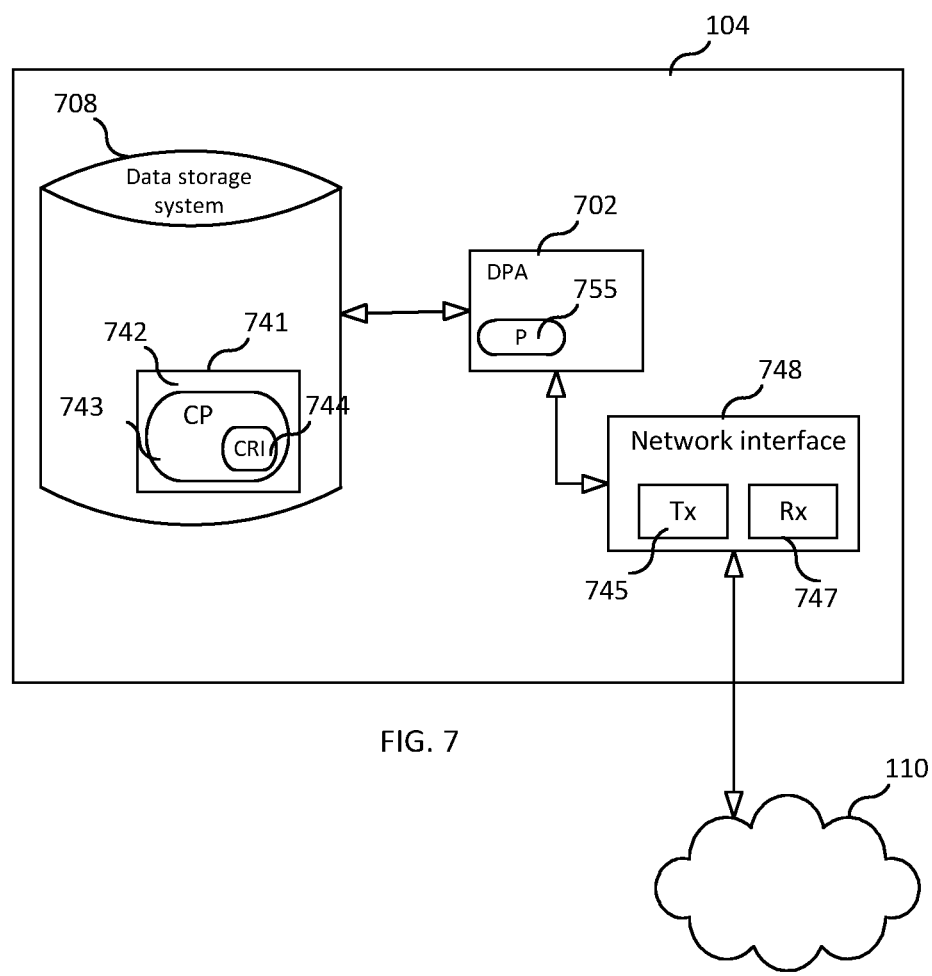
FIG. 7 is a block diagram of a broker according to some embodiments.

FIG. 7 is a block diagram of broker 104 according to some embodiments. As shown in FIG. 7, broker 104 may comprise: a data processing apparatus (DPA) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx)

745 and a receiver (Rx) 747 for enabling broker 104 to transmit data to and receive data from other nodes connected to a network 110 (e.g., an Internet Protocol (IP) network) to which network interface 748 is connected; and local storage unit (a.k.a., "data storage system") 708, which may include one or more non-volatile storage devices and/or one or more volatile storage devices (e.g., random access memory (RAM)). In embodiments where broker 104 includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media, memory devices (e.g., random access memory), and the like. In some embodiments, the CRI 744 of computer program 743 is configured such that when executed by data processing system 702, the CRI causes broker 104 to perform steps described above (e.g., steps described above with reference to the flow charts). In other embodiments, broker 104 may be configured to perform steps described herein without the need for code. That is, for example, data processing apparatus 702 may consist merely of one or more ASICs. Hence, the features of the embodiments described herein may be implemented in hardware and/or software.

Figure 8:
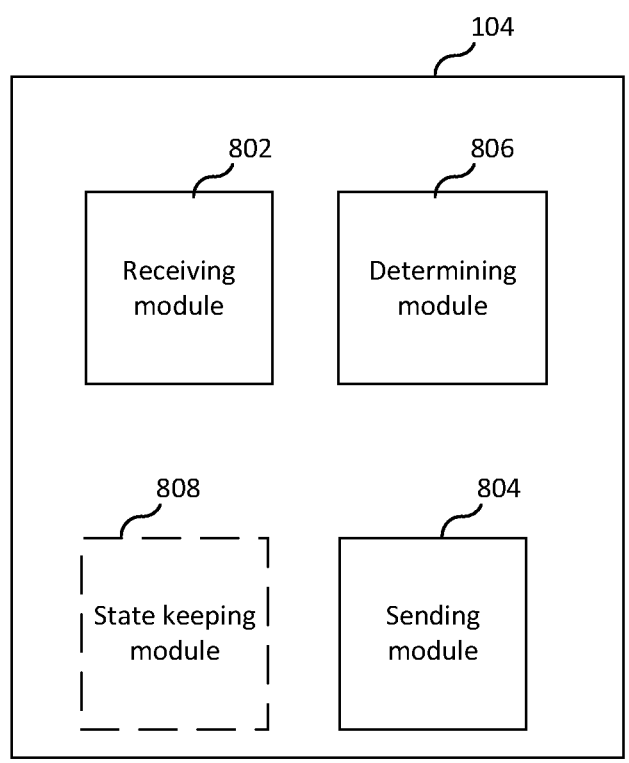
FIG. 8 is a diagram showing functional modules of a broker according to some embodiments.

FIG. 8 is a diagram showing functional modules of broker 104 according to some embodiments. As shown in FIG. 8, broker 104 includes a receiving module 802, a sending module 804 and a determining module 806. The receiving module 802 is adapted to employ a receiver (e.g., RX 747) to receive from a subscriber (e.g., sub1) a first subscribe message (e.g., message 300 or message 400) comprising a first topic identifier. The receiving module 802 is further adapted to employ the receiver to receive from a publisher (e.g., pub1) a first publication message (e.g., message 301 or message 401) comprising a second topic identifier and a complete object. The complete object consists of a set of information, and the set of information comprises: information corresponding to a first part of the complete object and information corresponding to a second part of the complete object that is different than the first part of the complete object, wherein the second topic identifier matches the first topic identifier.

The sending module 804 is configured to employ a transmitter (e.g., Tx 745) to send to sub1 a second publication message (e.g., message 302 or message 402) comprising the complete object. The receiving module 802 is further adapted to employ the receiver to receive from pub1 a third publication message (e.g., message 306 or message 405) comprising the second topic identifier and a partial object. The partial object comprises information corresponding to the first part of the complete object, but the partial object does not include any information corresponding to the second part of the complete object. Hence, the partial object is just some portion of the complete object.

The receiving module 802 is further adapted to employ the receiver to receive from sub1 a second subscribe message (e.g., message 307 or message 406) comprising the first topic identifier. The determining module 806 is configured such that, as a result of broker 104 receiving the second subscribe message, the determining module 806 determines whether to send to sub1 the partial object, wherein determining whether to send to sub1 the partial object comprises the determining module 806 determining whether sub1 has previously received the partial object. The sending module 804 is adapted to employ the transmitter to send to sub1 a fourth publication message (e.g., message 308 or message 407) comprising the partial object as a result of the determining module 806 determining that sub1 has not previously received the partial object.

Broker 104 may further include a state keeping module 808 adapted to keep state information corresponding to the subscriber 102, as described above.

Figure 9:
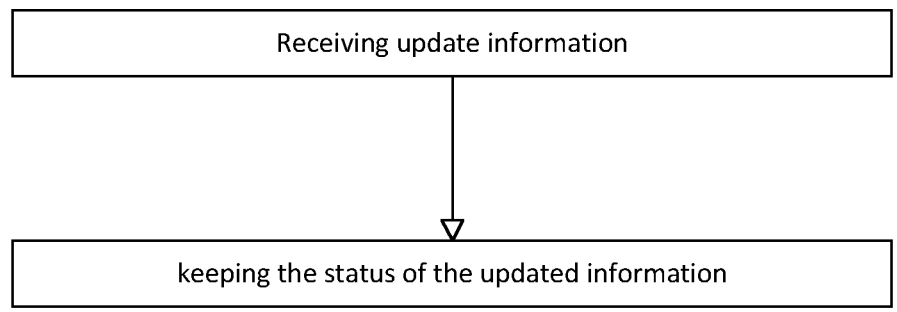
FIG. 9 is a flow chart illustrating a process according to some embodiments.

FIG. 9 is a flow chart illustrating a process 900, according to some embodiments, for consistent resource representation in publish-subscribe messaging system 100. The process includes broker 104 receiving from a publisher 106 (e.g., pub1) update information (i.e., a partial object) (step 902); and broker 104 keeping the status of the updated information in the system (step 904).

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for use in a publish-subscribe messaging system comprising a broker, a subscriber, and a publisher, the method comprising:

the broker receiving from the subscriber a first subscribe message comprising a first topic identifier;

the broker receiving from the publisher a first publication message comprising a second topic identifier and a complete object, wherein the complete object comprises a set of information comprising: information corresponding to a first part of the complete object and information corresponding to a second part of the complete object that is different than the first part of the complete object, wherein the second topic identifier matches the first topic identifier;

the broker sending to the subscriber a second publication message comprising the complete object;

the broker, after receiving the first publication message, receiving from the publisher a third publication message comprising the second topic identifier and a partial object comprising information corresponding to the first part of the complete object, but the partial object not including any information corresponding to the second part of the complete object;

after receiving the third publication message, the broker receiving from the subscriber a second subscribe message comprising the first topic identifier;

as a result of receiving the second subscribe message, the broker determining whether to send to the subscriber the partial object, wherein determining whether to send to the subscriber the partial object comprises the broker determining whether the subscriber has previously received the partial object; and after determining that the subscriber has not previously received the partial object, the broker sending to the subscriber a fourth publication message comprising the partial object.

2. The method of claim 1, wherein
the method further comprises the broker selecting a first tag value; and
the second publication message comprises the selected first tag value.

3. The method of claim 2, wherein
the second subscribe message comprises the first tag value, and
the broker determines whether the subscriber has previously received the partial object using the first tag value included in the second subscribe message.

4. The method of claim 3, wherein
the broker assigns a second tag value to the partial object, and
the broker determines that the subscriber has not previously received the partial object as a result of determining that the first tag value included in the second subscribe message is less than the second tag value assigned to the partial object.

5. The method of claim 1, wherein
the method further comprises the broker storing state information associated with the subscriber, and
the step of determining whether the subscriber has previously received the partial object comprises using the stored state information to determine whether the subscriber has previously received the partial object.

6. The method of claim 5, wherein
the stored state information associated with the subscriber comprises a version of the complete object stored in association with a subscriber identifier that identifies the subscriber,
the method further comprises the broker maintaining a master version of the complete object, and
the step of using the stored state information to determine whether the subscriber has previously received the partial object comprises comparing the version of the complete object stored in association with the subscriber identifier with the master version of the complete object.

7. The method of claim 5, wherein the stored state information associated with the subscriber comprises a first tag value associated with a subscriber identifier that identifies the subscriber.

8. The method of claim 7, wherein
the method further comprises the broker assigning a second tag value to the partial object, and
the step of using the stored state information to determine whether the subscriber has previously received the partial object comprises comparing the first tag value associated with the subscriber identifier with the second tag value assigned to the partial object.

9. The method of claim 1, wherein the fourth publication message further comprises at least part of a second partial object transmitted by the publisher to the broker.

10. A broker apparatus for use in a publish-subscribe messaging system, the broker comprising:
a receiver;
a transmitter; and
processing circuitry, wherein the broker is configured to:
employ the receiver to receive from a subscriber a first subscribe message comprising a first topic identifier,
employ the receiver to receive from a publisher a first publication message comprising a second topic identifier and a complete object, the complete object comprising of a set of information comprising: information corresponding to a first part of the complete object and information corresponding to a second part of the complete object that is different than the first part of the complete object, wherein the second topic identifier matches the first topic identifier,
employ the transmitter to send to the subscriber a second publication message comprising the complete object,
employ the receiver to receive from the publisher a third publication message comprising the second topic identifier and a partial object, the partial object comprising information corresponding to the first part of the complete object, but the partial object does not include any information corresponding to the second part of the complete object,
employ the receiver to receive from the subscriber a second subscribe message comprising the first topic identifier,
as a result of receiving the second subscribe message, determine whether to send to the subscriber the partial object by determining whether the subscriber has previously received the partial object, and
employ the transmitter to send to the subscriber a fourth publication message comprising the partial object as a result of the determining module determining that the subscriber has not previously received the partial object.

11. The broker of claim 10, wherein
the broker is adapted to select a first tag value; and
the second publication message comprises the first tag value.

12. The broker of claim 11, wherein
the second subscribe message comprises the first tag value, and
the broker is adapted to determine whether the subscriber has previously received the partial object using the first tag value included in the second subscribe message.

13. The broker of claim 11, wherein
the broker is adapted to assign a second tag value to the partial object, and
the broker is adapted to determine that the subscriber has not previously received the partial object as a result of determining that the first tag value included in the second subscribe message is less than the second tag value assigned to the partial object.

14. The broker of claim 10, wherein
the broker is adapted to store state information associated with the subscriber, and
the broker is adapted to determine whether the subscriber has previously received the partial object by using the stored state information to determine whether the subscriber has previously received the partial object.

15. The broker of claim 14, wherein the stored state information associated with the subscriber comprises a version of the complete object stored in association with a subscriber identifier that identifies the subscriber.

16. The broker of claim 15, wherein
the broker is adapted to maintain a master version of the complete object, and
the broker is adapted to use the stored state information to determine whether the subscriber has previously received the partial object by comparing the version of the complete object stored in association with the subscriber identifier with the master version of the complete object.

17. The broker of claim 14, wherein
the stored state information associated with the subscriber comprises a first tag value associated with a subscriber identifier that identifies the subscriber, the broker is adapted to assign a second tag value to the partial object, and the broker is adapted to use the stored state information to determine whether the subscriber has previously received the partial object by comparing the first tag value associated with the subscriber identifier with the second tag value assigned to the partial object.

18. The broker of claim 10, wherein the fourth publication message further comprises at least part of a second partial object transmitted by the publisher to the broker.

19. A broker apparatus for use in a publish-subscribe messaging system, the broker being adapted to:

receive from a subscriber a first subscribe message comprising a first topic identifier;

receive from a publisher a first publication message comprising a second topic identifier and a complete object, the complete object comprising of a set of information comprising:

information corresponding to a first part of the complete object and information corresponding to a second part of the complete object that is different than the first part of the complete object, wherein the second topic identifier matches the first topic identifier;

send to the subscriber a second publication message comprising the complete object;

receive from the publisher a third publication message comprising the second topic identifier and a partial object, the partial object comprising information corresponding to the first part of the complete object, but the partial object does not include any information corresponding to the second part of the complete object;

receive from the subscriber a second subscribe message comprising the first topic identifier;

as a result of broker receiving the second subscribe message, determine whether to send to the subscriber the partial object, wherein determining whether to send to the subscriber the partial object comprises determining whether the subscriber has previously received the partial object; and send to the subscriber a fourth publication message comprising the partial object as a result of determining that the subscriber has not previously received the partial object.

20. A computer program product comprising a non-transitory computer readable medium storing a computer program comprising instructions which, when executed on at least one processor, cause the at least one processor to carry out the method of claim 1.

* * * * *